(12) United States Patent
Su

(10) Patent No.: US 11,025,442 B2
(45) Date of Patent: Jun. 1, 2021

(54) METHOD FOR A NETWORK APPARATUS TO CONTROL POWER PROVISION TO A POWERED DEVICE CONNECTED TO THE NETWORK APPARATUS, NETWORK APPARATUS IMPLEMENTING THE METHOD, AND POWER SWITCHING MANAGEMENT MODULE OF THE NETWORK APPARATUS

(71) Applicant: Yoda Communications, Inc., Hsin-Chu (TW)

(72) Inventor: Young-Lim Su, Hsin-Chu (TW)

(73) Assignee: YODA COMMUNICATIONS, INC., Hsin-Chu (TW)

( * ) Notice: Subject to any disclaimer, the term of this patent is extended or adjusted under 35 U.S.C. 154(b) by 76 days.

(21) Appl. No.: 16/523,705

(22) Filed: Jul. 26, 2019

(65) Prior Publication Data

US 2020/0052914 A1 Feb. 13, 2020

(30) Foreign Application Priority Data

Aug. 8, 2018 (TW) .................................. 107127601

(51) Int. Cl.
*H04L 12/10* (2006.01)
*G06F 1/3215* (2019.01)
*G06F 1/26* (2006.01)

(52) U.S. Cl.
CPC .............. *H04L 12/10* (2013.01); *G06F 1/266* (2013.01); *G06F 1/3215* (2013.01)

(58) Field of Classification Search
CPC ...... G06F 1/266; G06F 1/3215; G06F 1/3209; G06F 1/3278; G06F 1/3287; G06F 1/3296; G06F 1/3243; G06F 1/3246; G06F 1/3206; G06F 1/3203; G06F 1/32; H04L 12/10; H04L 12/40045
See application file for complete search history.

(56) References Cited

U.S. PATENT DOCUMENTS

| | | | | |
|---|---|---|---|---|
| 8,674,546 B1* | 3/2014 | Dix | .......................... | H04L 12/10 307/65 |
| 2009/0073957 A1* | 3/2009 | Newland | .................. | G06F 1/263 370/352 |
| 2010/0241889 A1* | 9/2010 | Fu | .......................... | G06F 1/3278 713/324 |
| 2013/0339760 A1* | 12/2013 | Zimmerman | ............. | G06F 1/26 713/300 |
| 2014/0361608 A1* | 12/2014 | Wang | ................. | H04L 12/40045 307/2 |

* cited by examiner

*Primary Examiner* — Jaweed A Abbaszadeh
*Assistant Examiner* — Brian J Corcoran
(74) *Attorney, Agent, or Firm* — Hamre, Schumann, Mueller & Larson, P.C.

(57) ABSTRACT

A method for a network apparatus to control power provision to a powered device is proposed. The network apparatus is configured for connection to the powered device, an electronic device, and a power supply device. The network apparatus permits transmission of electronic power provided by the power supply device to the powered device therethrough when the electronic device is communicatively connected to the network apparatus, and does not permit transmission of electronic power provided by the power supply device to the powered device therethrough when the electronic device is not communicatively connected to the network apparatus.

10 Claims, 2 Drawing Sheets

METHOD FOR A NETWORK APPARATUS TO CONTROL POWER PROVISION TO A POWERED DEVICE CONNECTED TO THE NETWORK APPARATUS, NETWORK APPARATUS IMPLEMENTING THE METHOD, AND POWER SWITCHING MANAGEMENT MODULE OF THE NETWORK APPARATUS

CROSS-REFERENCE TO RELATED APPLICATION

This application claims priority of Taiwanese Invention Patent Application No. 107127601, filed on Aug. 8, 2018.

FIELD

The disclosure relates to a method for a network apparatus to control power provision to a powered device connected to the network apparatus.

BACKGROUND

The Ethernet is a family of computer networking technologies standardized by the Institute of Electrical and Electronics Engineers (IEEE) and has been commonly used in industries, academic circles, and the public.

Networking cables for connecting electronic devices to the Ethernet network are usually made by connecting CAT-5 (Category 5) cables or CAT-5e (Category 5e) cables to 8P8C modular connectors (also called RJ45 connectors). Power over Ethernet (PoE), which is a technology developed based on 10/100 Mbps Ethernet, has been well developed. PoE technology uses the networking cables to carry out data transmission and power provision simultaneously, so it may not be necessary for a powered device that is connected to an Ethernet network to have a power cord for receiving electric power.

Under the PoE technology, powered devices would be activated and would continuously consume electric power once connected to the Ethernet network. However, some powered devices are not required to operate twenty four hours a day. If these powered devices are located at places that are not easy to reach (e.g., high above the ground), it is inconvenient to remove the networking cables connected to e powered devices in order to save power.

SUMMARY

Therefore, an object of the disclosure is to provide a power switching management method that can alleviate at least one of the drawbacks of the prior art.

According to the disclosure, the method is adapted for a network apparatus to control power provision to a powered device connected to the network apparatus. The network apparatus includes a first port for connection to an electronic device, a second port for connection to the powered device, a third port for connection to a power supply device that provides electric power, a transmission unit connected between the first port and the second port for data transmission between the electronic device and the powered device, a switch unit connected between the transmission unit and the third port for controlling transmission of electric power from the power supply device to the powered device, and a control unit connected to the transmission unit and the switch unit. The method includes: by the transmission unit, detecting whether the transmission unit is communicatively connected to the electronic device via the first port, and providing a first-port connection status that indicates a result of the detection to the control unit; by the control unit, controlling the switch unit to operate in a conductive state where electric power received from the third port is permitted to pass through the switch unit and is directed toward the transmission unit when the first-port connection status indicates that the transmission unit is communicatively connected to the electronic device via the first port; by the transmission unit, transmitting the electric power passing through the third port and the switch unit to the powered device via the second port upon receipt of the electric power passing through the third port and the switch unit; and by the control unit when an interruption condition is met, controlling the switch unit to operate in a non-conductive state where electric power received from the third port is not permitted to pass through the switch unit, wherein the interruption condition includes that the first-port connection status indicate that the transmission unit is not communicatively connected to the electronic device via the first port.

Another object of this disclosure is to provide a network apparatus that implements the method of this disclosure.

According to this disclosure, the network apparatus includes a first port for connection to an electronic device, a second port for connection to a powered device, a third port for connection to a power supply device that provides electric power, a transmission unit connected between the first port and the second port for data transmission between the electronic device and the powered device, a switch unit connected between the third port and the transmission unit and having a control terminal, and a control unit connected to the control terminal of the switch unit for controlling operation of the switch unit, and connected to the transmission unit. The transmission unit is configured to generate a first-port connection status that indicates whether the transmission unit is communicatively connected to the electronic device. The switch unit is operable to switch between a conductive state where electric power received from the third port is permitted to pass through the switch unit and is directed toward the transmission unit, and a non-conductive state where electric power received from the third port is not permitted to pass through the switch unit. The control unit receives the first-port connection status from the transmission unit, and is configured to control the switch unit to operate in the conductive state when the first-port connection status indicates that the transmission unit is communicatively connected to the electronic device, and to control the switch unit to operate in the non-conductive state when an interruption condition is met. The interruption condition includes that the first-port connection status indicate that the transmission unit is not communicatively connected to the electronic device. The transmission unit is further configured to transmit the electric power passing through the third port and the switch unit to the powered device via the second port upon receipt of the electric power passing through the third port and the switch unit.

Yet another object of this disclosure is to provide a power switching management module for use in the network apparatus. The network apparatus includes a first port for connection to an electronic device, a second port for connection to the powered device, a third port for connection to a power supply device that provides electric power, and a transmission unit connected between the first port and the second port for data transmission between the electronic device and the powered device, and configured to generate a first-port connection status that indicates whether the transmission unit is communicatively connected to the electronic device via the first port.

According to this disclosure, the power switching management module includes a switch unit to be connected between the third port and the transmission unit, and a control unit connected to the control terminal of the switch unit for controlling operation of the switch unit, and to be connected to the transmission unit for receiving the first-port connection status.

The switch unit has a control terminal, and is operable to switch between a conductive state where electric power received from the third port is permitted to pass through the switch unit and is directed toward the transmission unit so that the transmission unit transmits the electric power passing through the third port and the switch unit to the powered device via the second port upon receipt of the electric power passing through the third port and the switch unit, and a non-conductive state where electric power received from the third port is not permitted to pass through the switch unit. The control unit is configured to control the switch unit to operate in the conductive state when the first-port connection status indicates that the transmission unit is communicatively connected to the electronic device via the first port, and to control the switch unit to operate in the non-conductive state when an interruption condition is met. The interruption condition includes that the first-port connection status indicate that the transmission unit is not communicatively connected to the electronic device

BRIEF DESCRIPTION OF THE DRAWINGS

Other features and advantages of the disclosure will become apparent in the following detailed description of the embodiments) with reference to the accompanying drawings, of which.

DETAILED DESCRIPTION

Figure 1:
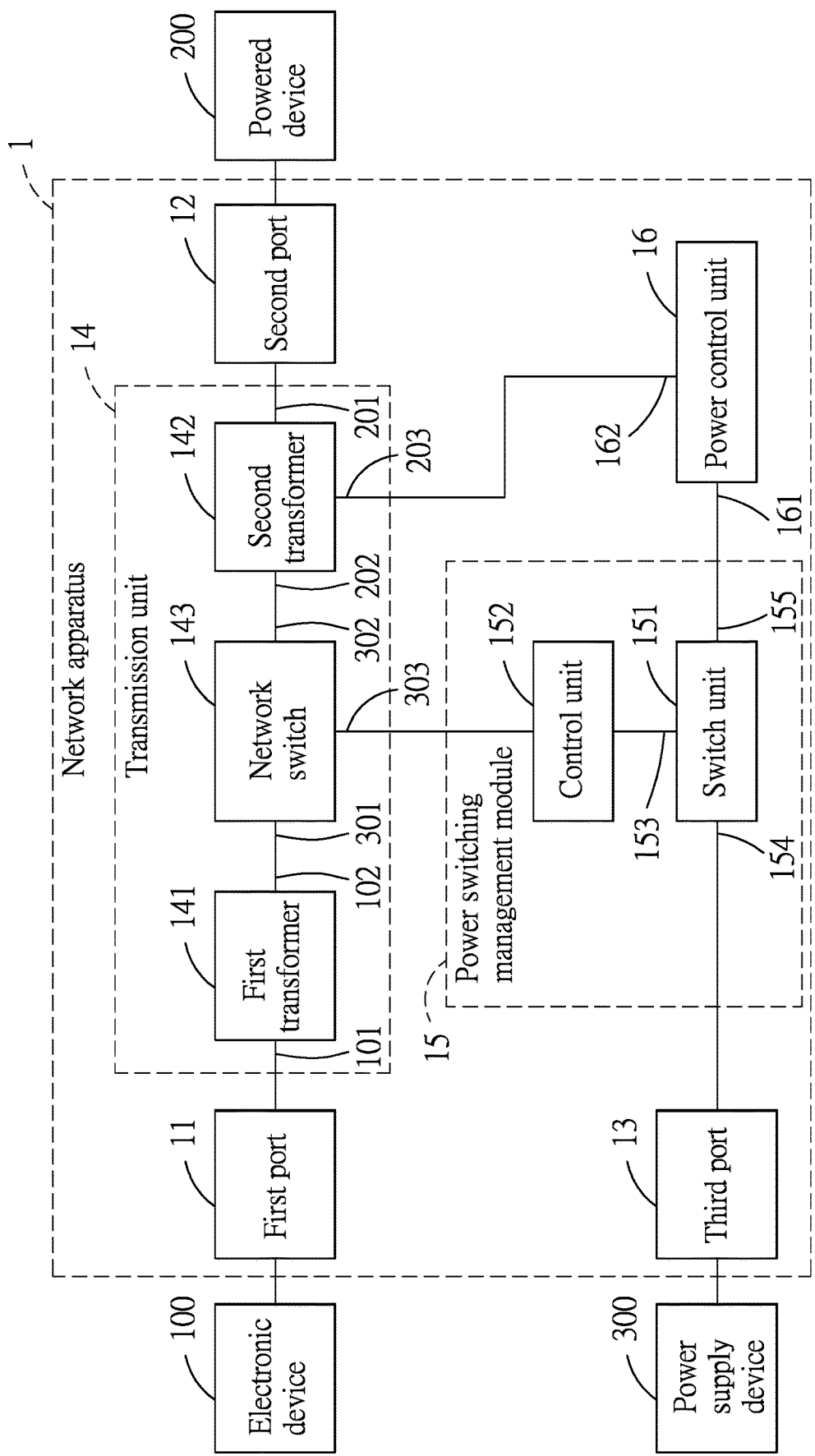
FIG. 1 is a block diagram illustrating an embodiment of a network apparatus according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, the embodiment of the network apparatus 1 according to this disclosure is implemented as, for example, a PoE injector, but this disclosure is not limited in this respect. The network apparatus includes a first port 11 for connection to an electronic device 100, a second port 12 for connection to a powered device 200, a third port 13 for connection to a power supply device 300, a transmission unit 14, a power switching management module 15, and a power control unit 16.

In this embodiment, the electronic device 100 may be a computer device (e.g., a desktop computer, a notebook computer, etc.) or a network device (e.g. a modem, a network hub, a network switch, a router, etc.) that has an Ethernet port. The powered device 200 may be, for example, an IP camera (or called network camera) that includes an Ethernet port and that supports the PoE technology (i.e., capable of receiving electric power under the PoE technology). The first port 11 and the second port 12 of the network device 1 are realized as Ethernet ports. The Ethernet ports of the network device 1, the electronic device 100 and the powered device 200 may be, for example, compatible with 8P8C or RJ45 connectors in this embodiment. Accordingly, the electronic device 100 is electrically connected to the first port 11 via a networking cable, and the powered device 200 is electrically connected to the second port 12 via another networking cable, but this disclosure is not limited in this respect. In this embodiment, the power supply device 300 is exemplified as a direct current (DC) power supply, and the third port 13 of the network device 1 is exemplified as a DC power socket electrically connected the power supply device 300 via a DC power cord, but this disclosure is not limited in this respect.

The transmission unit 14 is electrically connected between the first port 11 and the second port 12 for data transmission and communication between the electronic device 100 and the powered device 200.

In this embodiment, the transmission unit 14 includes a first transformer 141, a second transformer 142, and a network switch 143 that is electrically connected between the first transformer 141 and the second transformer 142. The first transformer 141 may be, for example, a non-PoE transformer, and has a first side 101 that is electrically connected to the first port 11, and a second side 102 that is electrically coupled to the first side 101 via electromagnetic induction. The second transformer 142 may be, for example, a PoE transformer, and has a first side 201 that is electrically connected to the second port 12, a second side 202 that is electrically coupled to the first side 201 via electromagnetic induction, and a third side 203 that is electrically coupled to the first side 201 via electromagnetic induction. The network switch 143 may be, for example, an Ethernet switch, and has a first terminal 301 electrically connected to the second side 102 of the first transformer 141, a second terminal 302 electrically connected to the second side 202 of the second transformer 142, and a third terminal 303. Ways to realize the first transformer 141, the second transformer 142 and the network switch 143 should be well known to one having ordinary skill in the art, so details thereof are omitted herein for the sake of brevity.

In this embodiment, when the electronic device 100 transmits data to the first side 101 of the first transformer 141 via the first port 11, the data is coupled from the first side 101 to the second side 102 by electromagnetic induction, and then reaches the first terminal 301 of the network switch 143. Upon receipt of the data via the first terminal 301, the network switch 143 transmits the data to the second side 202 of the second transformer 142 via the second terminal 302, and then the data is coupled to the first side 201 of the second transformer 142 by electromagnetic induction, so the powered device 200 receives the data via the second port 12.

On the other hand, when the powered device 200 transmits data to the first side 201 of the second transformer 142 via the second port 12, the data is coupled from the first side 201 to the second side 202 by electromagnetic induction, and then reaches the second terminal 302 of the network switch 143. Upon receipt of the data via the second terminal 302, the network switch 143 transmits the data to the second side 102 of the first transformer 141 via the first terminal 301, and then the data is coupled to the first side 101 of the first transformer 141 by electromagnetic induction, so the electronic device 100 receives the data via the first port 11.

In this embodiment, the network switch 143 continuously detects whether the network switch 143 is communicatively connected to the electronic device 100 via the first port 11, generates first-port connection status that indicates whether the network switch 143 is communicatively connected to the electronic device 100 via the first port 11 and that is continuously updated based on the results of detection, and outputs the first-port connection status via the third terminal 303. In detail, the first-port connection status includes a connection signal and an information signal. In this embodiment, when the network switch 143 detects communicative connection to the electronic device 100 via the first port 11, the connection signal may be at a logic high level, and the information signal indicates which type of the Ethernet is used in the connection between the network switch 143 and the electronic device 100 (e.g., 10 Mbps, 100 Mbps, 1000 Mbps, etc.). When the network switch 143 detects no communicative connection to the electronic device 100, the connection signal may be at a logic low level, and the information signal indicates no connection. However, this disclosure not limited to such implementation.

The power switching management module 15 includes a switch unit 151 and a control unit 152. The switch unit 151 has a control terminal 153, a first terminal 154 electrically connected to the third port 13, and a second terminal 155. The control unit 152 is electrically connected to the third terminal 303 of the network switch 143 for receiving the first-port connection status, is electrically connected to the control terminal 153 of the switch unit 151 for controlling operation of the switch unit 151, and may be realized as a processor or a controller. The switch unit 151 may be realized as, for example, a relay or an active switch made by metal-oxide-semiconductor field effect transistors (MOSFETs), and is operable by the control unit 152 to operate between a conductive state and a non-conductive state. In the conductive state, the switch unit 151 makes electric connection between the first terminal 154 and the second terminal 155, so electric power provided by the power supply device 300 via the third port 13 is permitted to pass through the switch unit 151. In the non-conductive state, the switch unit 151 breaks electric connection between the first terminal 154 and the second terminal 155, so electric power provided by the power supply device 300 via the third port 13 is not permitted to pass through the switch unit 151.

In this embodiment, the control unit 152 controls the switch unit 151 to operate in the conductive state when the first-port connection status received from the network switch 143 indicates that the network switch 143 is communicatively connected to the electronic device 100 (via the first transformer 141 and the first port 11), and controls the switch unit 151 to operate in the non-conductive state when an interruption condition is met. In this embodiment, the interruption condition includes that the first-port connection status indicate that the network switch 143 is not communicatively connected to the electronic device 100 (via the first transformer 141 and the first port 11), and that a time length for which the network switch 143 is not communicatively connected to the electronic device 100 (via the first transformer 141 and the first port 11) have reached a predetermined time threshold, which may be set as, for example, 10 ms, but this disclosure is not limited in this respect. In one implementation, a resistor and a capacitor that are in series connection may be used to determine the predetermined time threshold, and to accumulate the time length for which the network switch 143 is not communicatively connected to the electronic device 100.

The power control unit 16, which may be realized as a switch, includes a first terminal 161 electrically connected to the second terminal 155 of the switch unit 151, and a second terminal 162 electrically connected to the third side 203 of the second transformer 142.

As a result, the electric power provided by the power supply device 300 is directed toward the transmission unit 14 via the power control unit 16 when the switch unit 151 is in the conductive state (i.e., the first-port connection status indicates that the network switch 143 is communicatively connected to the electronic device 100 via the first transformer 141 and the first port 11). In detail, the power control unit 16 receives the electric power provided by the power supply device 300 via the third port 13 and the switch unit 151 when the switch unit 151 is in the conductive state. When the power control unit 16 receives the electric power passing through the third port 13 and the switch unit 151 (i.e., the switch unit 151 is in the conductive state), the control unit 152 detects whether the powered device 200 that is connected to the second port 12 is a PoE powered device (i.e., supporting the PoE technology/conforming to PoE specifications) via the second transformer 142. Upon detecting/determining that the powered device 200 is a PoE powered device, the control unit 152 controls, via the switch unit 151, the power control unit 16 to transmit the electric power provided by the power supply device 300 and passing through the third port 13 and the switch unit 151 to the third side 203 of the second transformer 142 via the second terminal 162. When the second transformer 142 receives the electric power from the power control unit 16 via the third side 203, the second transformer 142 couples the electric power from the third side 203 to the first side 201, so the powered device 200 receives the electric power via the second port 12, and the powered device 200 can operate normally and perform functions (e.g., recording images/video, but this disclosure is not limited to such). In this embodiment, the powered device 200 communicates and performs data transmission with the electronic device 100 via the first port 11, the transmission unit 14 and the second port 12 when operating normally and performing its own functions, but this disclosure is not limited in this respect. Upon detecting/determining that the powered device 200 is not a PoE powered device, the control unit 152 controls, via the switch unit 151, the power control unit 16 not to provide the electric power provided by the power supply device 300 and passing through the third port 13 and the switch unit 15 to the third side 203 of the second transformer 142.

In this embodiment, the control unit 152 detects the powered device 200 using a mechanism for detecting PoE powered device, where the mechanism conforms to the IEEE 802.3 standard. In more detail, the control device 152 may provide a detecting voltage to the powered device 200 for detecting impedance of the powered device 200, and determine whether the powered device 200 is a PoE powered device by determining whether the detected impedance falls within an impedance range that is determined based on the standard. However, this disclosure is not limited in this respect.

When the switch unit 151 is in the non-conductive state (i.e., the first-port connection status indicates that there is no communicative connection established between the network switch 143 and the electronic device 100 via the first port 11 and the first transformer 141), since there is no electric connection established between the first terminal 154 and the second terminal 155, the power control unit 16 cannot receive the electric power provided by the power supply device 300 via the third port 13. Accordingly, the network apparatus 1 is unable to provide electric power to the powered device 200 via the second port 12, thereby saving electric power.

Figure 2:
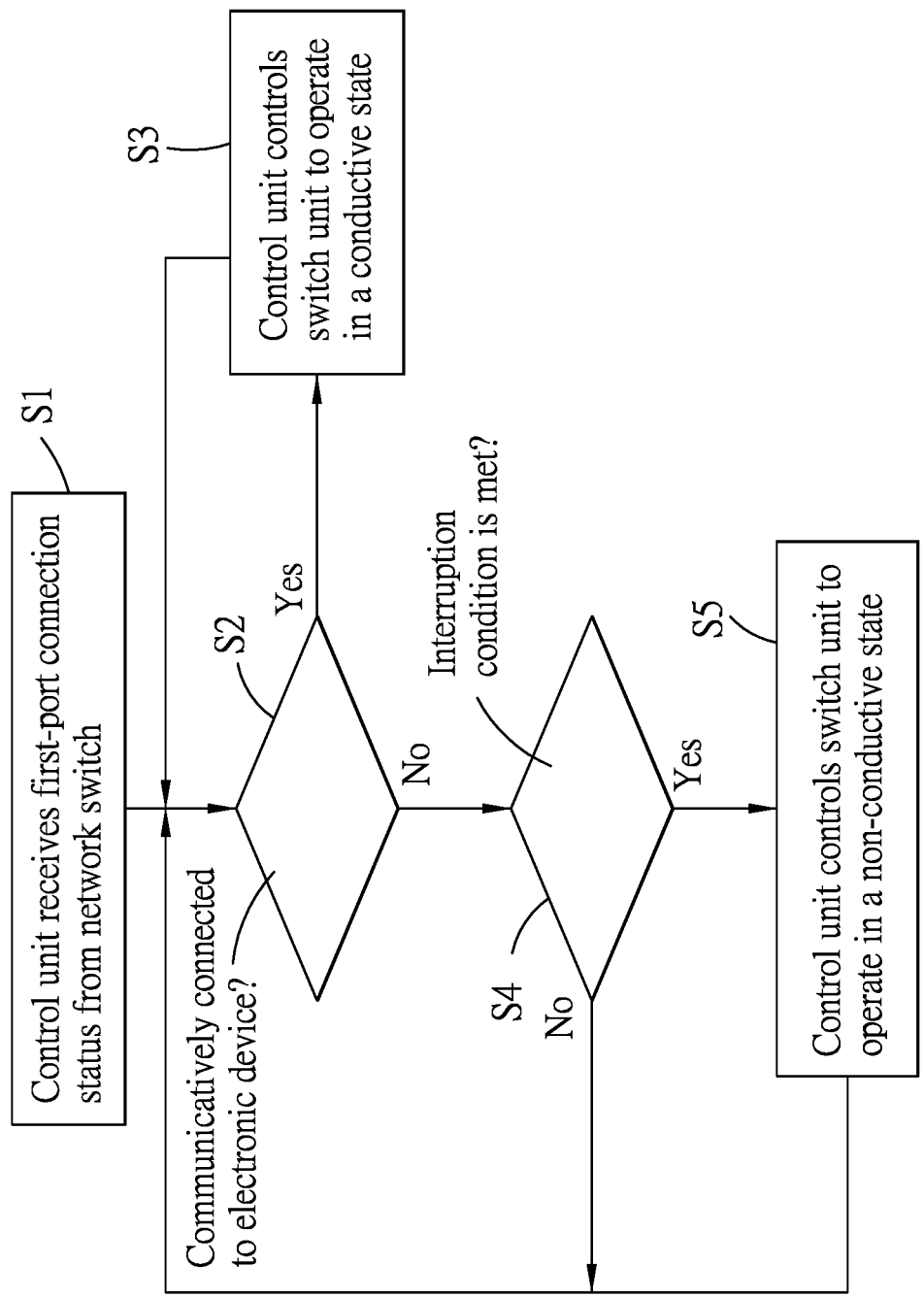
FIG. 2 is a flow chart illustrating steps of an embodiment of a power switching management method according to this disclosure.

Further referring to FIG. 2, an embodiment of the power switching management method for the network apparatus 1 to control power provision to the powered device 200 that is connected to the network apparatus 1 is illustrated to include steps S1 through S5.

In step S1, the control unit 152 continuously receives the first-port connection status from the network switch 143.

In step S2, the control unit 152 determines, based on the connection signal of the first-port connection status, whether the network switch 143 is communicatively connected to the electronic device 100 via the first transformer 141 and the first port 11. The flow goes to step S3 when the determination is affirmative, and goes to step S4 when otherwise.

In step S3, the control unit 152 controls the switch unit 151 to operate in the conductive state, so the electric power provided by the power supply device 300 is transmitted to the powered device 200 via the third port 13, the switch unit 151, the power control unit 16, the second transformer 142 and the second port 12. Then, step S2 is repeated after a predetermined period, which may be set as, for example, 10 μs, but this disclosure is not limited in this respect.

In step S4, the control unit 152 determines whether the interruption condition is met based on the connection signal of the first-port connection status. The flow goes to step S5 when the determination is affirmative, and when otherwise, the flow goes back to step S2 after the predetermined period has elapsed.

In step S5, the control unit 152 controls the switch unit 151 to operate in the non-conductive state, so the electric power provided by the power supply device 300 is unable to reach to the powered device 200, and the powered device 200 does not operate or work accordingly. Then, step S2 is repeated after the predetermined period.

As a result, the network apparatus 1 transmits the electric power provided by the power supply device 300 to the powered device 200 when communicatively connected to the electronic device 100 via the first port 11, and blocks transmission of the electric power provided by the power supply device 300 to the powered device 200 when not communicatively connected to the electronic device 100 via the first port 11 (i.e., the interruption condition is satisfied). Therefore, when a user does not need the powered device 200 to be in operation at that moment, the user may simply cut off the communicative connection between the electronic device 100 and the network apparatus 1 to satisfy the interruption condition, thereby saving power. In practice, the communicative connection between the electronic device 100 and the network apparatus 1 may be cut off by, for example but not limited to: physically removing the network cable that interconnects the electronic device 100 and the network apparatus 1 from either the electronic device 100 or the network apparatus 1; or disabling the functionality of the Ethernet socket of the electronic device 100 via software operation on the electronic device 100 (in such case physical removal of the network cable that interconnects the electronic device 100 and the network apparatus 1 is not required). In some embodiments, the user may operate the electronic device 100 to set time points at which the Ethernet socket of the electronic device 100 is desired to be automatically activated or deactivated, so the powered device 200 that is connected to the network apparatus 1 is thus automatically powered on or off at the time points.

To sum up, the embodiment of the network apparatus 1 can control the switch unit 151 to operate in the non-conductive state upon determining that the time length for which the network switch 143 is not communicatively connected to the electronic device 100 has reached a predetermined time threshold, so the electric power provided by the power supply device 300 cannot be transmitted to the powered device 200 and the powered device 200 cannot work accordingly, enabling power saving in a convenient way.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for a network apparatus to control power provision to a powered device that is connected to the network apparatus and that supports Power over Ethernet (PoE) technology, the network apparatus including:
    a first port for connection to an electronic device;
    a second port for connection to the powered device;
    a third port for connection to a power supply device that provides electric power;
    a transmission unit connected between the first port and the second port for data transmission between the electronic device and the powered device, and including a non-PoE transformer connected to the first port, and a PoE transformer connected to the second port;
    a switch unit connected between the transmission unit and the third port for controlling transmission of electric power from the power supply device to the powered device; and
    a control unit connected to the transmission unit and the switch unit;
    said method comprising:
        by the transmission unit, detecting whether the transmission unit is communicatively connected to the electronic device via the first port, and providing a first-port connection status that indicates a result of the detection to the control unit;
        by the control unit, controlling the switch unit to operate in a conductive state where electric power received from the third port is permitted to pass through the switch unit and is directed toward the transmission unit when the first-port connection status indicates that the transmission unit is communicatively connected to the electronic device via the first port;

by the transmission unit, transmitting the electric power passing through the third port and the switch unit to the powered device via the second port upon receipt of the electric power passing through the third port and the switch unit; and by the control unit when an interruption condition is met, controlling the switch unit to operate in a non-conductive state where electric power received from the third port is not permitted to pass through the switch unit, wherein the interruption condition includes that the first-port connection status indicate that the transmission unit is not communicatively connected to the electronic device via the first port.

2. The method of claim 1, wherein the interruption condition further includes that a time length for which the transmission unit is not communicatively connected to the electronic device via the first port have reached a predetermined time threshold.

3. The method of claim 1, further comprising:

by a power control unit, which is connected between the switch unit and the transmission unit, providing the electric power received thereby to the transmission unit when the power control unit receives electric power passing through the third port and the switch unit and when the powered device that is connected to the second port is a Power on Ethernet (PoE) powered device.

4. The method of claim 1, the transmission unit further including a network switch connected to the control unit and connected between the first transformer and the second transformer, said method further comprising:

by the network switch, generating the first-port connection status, and providing the first-port connection status to the control unit.

5. A network apparatus comprising:

a first port for connection to an electronic device;

a second port for connection to a powered device that supports Power over Ethernet (PoE) technology;

a third port for connection to a power supply device that provides electric power;

a transmission unit connected between said first port and said second port for data transmission between the electronic device and the powered device, and configured to generate a first-port connection status that indicates whether said transmission unit is communicatively connected to the electronic device, said transmission unit including a non-PoE transformer connected to said first port, and a PoE transformer connected to said second port;

a switch unit connected between said third port and said transmission unit, having a control terminal, and operable to switch between a conductive state where electric power received from said third port is permitted to pass through said switch unit and is directed toward said transmission unit, and a non-conductive state where electric power received from said third port is not permitted to pass through said switch unit; and a control unit connected to said control terminal of said switch unit for controlling operation of said switch unit, connected to said transmission unit for receiving the first-port connection status, and configured to control said switch unit to operate in the conductive state when the first-port connection status indicates that said transmission unit is communicatively connected to the electronic device, and to control said switch unit to operate in the non-conductive state when an interruption condition is met;

wherein the interruption condition includes that the first-port connection status indicate that said transmission unit is not communicatively connected to the electronic device; and wherein said transmission unit is further configured to transmit the electric power passing through said third port and said switch unit to the powered device via said second port upon receipt of the electric power passing through said third port and said switch unit.

6. The network apparatus of claim 5, wherein the interruption condition further includes that a time length for which said transmission unit is not communicatively connected to the electronic device have reached a predetermined time threshold.

7. The network apparatus of claim 5, wherein said switch unit further has a first terminal connected to said third port, and a second terminal, and is configured to make electric connection between said first terminal and said second terminal when operating in the conductive state, and to break electric connection between said first terminal and said second terminal when operating in the non-conductive state; said network apparatus further comprising:

a power control unit connected between said second terminal of said switch unit and said transmission unit, and configured to provide the electric power received thereby to said transmission unit when said power control unit receives electric power passing through said third port and said switch unit and when the powered device that is connected to said second port is a Power over Ethernet (PoE) powered device.

8. The network apparatus of claim 5, wherein said transmission unit further includes a network switch connected to said control unit and connected between said first transformer and said second transformer; and wherein said network switch is configured to generate the first-port connection status, and to provide the first-port connection status to said control unit.

9. A power switching management module for use in a network apparatus that includes:

a first port for connection to an electronic device;

a second port for connection to the powered device that supports Power over Ethernet (PoE) technology;

a third port for connection to a power supply device that provides electric power; and a transmission unit connected between the first port and the second port for data transmission between the electronic device and the powered device, and configured to generate a first-port connection status that indicates whether the transmission unit is communicatively connected to the electronic device via the first port, the transmission unit including a non-PoE transformer connected to the first port, and a PoE transformer connected to the second port;

said power switching management module comprising:

a switch unit to be connected between the third port and the transmission unit, having a control terminal, and operable to switch between a conductive state where electric power received from the third port is permitted to pass through said switch unit and is directed toward the transmission unit so that the transmission unit transmits the electric power passing through the third port and said switch unit to the powered device via the second port upon receipt of the electric power passing through the third port and said switch unit, and a non-conductive state where electric power received from the third port is not permitted to pass through said switch unit; and a control unit connected to said control terminal of said switch unit for controlling operation of said switch unit, to be connected to the transmission unit for receiving the first-port connection status, and configured to control said switch unit to operate in the conductive state when the first-port connection status indicates that the transmission unit is communicatively connected to the electronic device via the first port, and to control the switch unit to operate in the non-conductive state when an interruption condition is met;

wherein the interruption condition includes that the first-port connection status indicate that the transmission unit is not communicatively connected to the electronic device.

10. The power switching management module of claim 9, wherein the interruption condition further includes that a time length for which the transmission unit is not communicatively connected to the electronic device via the first port have reached a predetermined time threshold.

\* \* \* \* \*